(12) United States Patent
Kim et al.

(10) Patent No.: US 7,746,550 B2
(45) Date of Patent: Jun. 29, 2010

(54) TERAHERTZ OR INFRARED FILTER USING SHAPE RESONANCE

(75) Inventors: Dae-Sik Kim, Seoul (KR); Sae Chae Jeoung, Daejeon (KR); Joong Wook Lee, Seoul (KR); Min Ah Seo, Seoul (KR)

(73) Assignee: Seoul National University Industry Foundation, Seoul (KR)

( * ) Notice: Subject to any disclaimer, the term of this patent is extended or adjusted under 35 U.S.C. 154(b) by 684 days.

(21) Appl. No.: 11/491,961

(22) Filed: Jul. 25, 2006

(65) Prior Publication Data
US 2007/0165295 A1    Jul. 19, 2007

(30) Foreign Application Priority Data
Jan. 18, 2006    (KR) ............... 10-2006-0005377

(51) Int. Cl.
*G06K 7/10* (2006.01)
(52) U.S. Cl. .................. 359/350; 385/129
(58) Field of Classification Search ............. None
See application file for complete search history.

(56) References Cited

U.S. PATENT DOCUMENTS 5,973,316 A    10/1999    Ebbesen et al.
2006/0273245 A1 *   12/2006    Kim et al. ............ 250/226

FOREIGN PATENT DOCUMENTS

JP    11-72607    3/1999

OTHER PUBLICATIONS

Korean Patent Office Action, Application No. 2006-5377—Dec. 15, 2006.

* cited by examiner

*Primary Examiner*—Stephone B Allen
*Assistant Examiner*—Derek S Chapel
(74) *Attorney, Agent, or Firm*—Nixon & Vanderhye PC

(57) ABSTRACT

A filter having a high transmittance. The filter includes a substrate having a first surface and a second surface, and a periodic or random array of through-holes formed so as to pass through the first surface and the second surface. The through-hole has a size of subwavelength at a range of infrared and terahertz wave. Here, transmission resonance characteristic of incident light on the first surface is controlled by a shape of the through-hole.

7 Claims, 20 Drawing Sheets

TERAHERTZ OR INFRARED FILTER USING SHAPE RESONANCE

BACKGROUND OF THE INVENTION

1. Field of the Invention

The present invention relates to an electromagnetic wave filter at terahertz or infrared region using shape resonance and surface plasmon resonance in through-holes formed on a metallic layer and having various structures of periodic or random arrays.

2. Background of the Related Art

In general, in-depth research has been performed in order to improve transmission characteristics at visible light regions through surface plasmon on a metallic layer having a periodic through-hole array structure. In this structure, incident light transmits efficiently a through-hole having a size much smaller than half the wavelength.

In the recent years, study on these transmission characteristics has been expanded into infrared, terahertz and microwave regions. It has been known that the transmission resonance at these regions is closely related to not only surface wave on a metallic layer but a through-hole shape constituting a periodic structure. In practice, however, it is necessary to provide more comprehensive understanding as to how the resonance due to a through-hole shape is related to transmission characteristics, and how the transmission due to the shape resonance is characterized.

SUMMARY OF THE INVENTION

Therefore, the present invention has been made in view of the above problems.

The first object of the invention is to provide a terahertz or infrared filter having a high efficiency of 90% or more through a periodic or random array of various shaped through-holes on a metallic layer.

The second object of the invention is to provide a filter having a single, dual, triple, or more transmission resonance wavelength, in which the shape of through-hole forming the periodic array is designed appropriately. In case of a symmetric through-hole such as a circle, a square, a rectangle, a slit, or the like, a single resonance filter is provided. In case of an asymmetrical through-hole such as a horseshoe, an ∈shape, a dual resonance wavelength filter is provided. Through an appropriate combination of the above basic shapes, a triple or more resonance wavelength filter is provided.

The third object of the invention is to provide a wavelength-variable filter of wider wavelength band while maintaining a high efficiency of 90% or more, in which the length perpendicular to the polarization direction of incident light in a rectangular through-hole structure.

The fourth object of the invention is to provide an omni-direction filter due to an outstanding development of a shape resonance when the shape resonance wavelength position is relatively far away compared to the surface plasmon resonance position. For example, in case of a basic shape such as a rectangle, as its length along the direction perpendicular to the polarization of incident light becomes longer, the shape resonance wavelength becomes further away from the surface plasmon resonance wavelength. Thus, an omni-directional filter can be easily achieved.

The fifth object of the invention is to provide a wavelength switching filter by varying the ratio of vertical lengths in a rectangular shape. The transmission resonance wavelength is determined by the polarization direction of incident light. Because the ratio of two vertical lengths is different, the polarization to the two vertical directions recognizes different lengths perpendicular to each other as a shape resonance. Thus, this filter can be achieved. This wavelength switching filter occurs whenever different shapes exist with respect to two directions on a metallic layer, in addition to a rectangular shape.

The sixth object of the invention is to provide a terahertz or infrared filter exhibiting 90% or more transmittance in not only a periodic array but also a random array, in case of a special structure such as an elongated rectangle. In this case, also, the shape resonance is exhibited stronger as it is not affected by a surface plasmon resonance.

The seventh object of the invention is to provide a wavelength number control filter capable of controlling the number of transmission resonance wavelengths depending upon the polarization direction of incident light, in a special case of asymmetrical shape. In case of a horseshoe, a special case for the asymmetrical shape, when the polarization of incident light lies perpendicular to the opening of the horseshoe, a single transmission wavelength occurs. However, if the polarization of incident light lies parallel with the opening of the horseshoe, two transmission resonance wavelengths occur. Thus, the number of the resonance wavelengths can be controlled by rotating the polarization direction of incident light by 90 degrees.

The eighth object of the invention is to provide a wavelength selectable dual filter having two transmission resonance wavelengths of different wavelength positions depending upon the polarization direction of incident light, in case of another special case for the asymmetric shape such as an ∈ shape.

The ninth object of the invention is to provide a wavelength variable-nonvariable filter, in which, in case of a dual filter having two transmission resonance wavelengths, one of the two wavelengths lies near Rayleigh line and the other one of them lies far away from Rayleigh line such that one of them has a wavelength variable characteristic and the other one has a wavelength nonvariable characteristic. Since the transmission resonance wavelength position is determined by a shape resonance, the asymmetrical structure having two transmission resonance wavelengths can be designed appropriately to achieve various types of wavelength variable-nonvariable filter.

The tenth object of the invention is to provide a quasi-monochromatic filter having a narrow wavelength band in a structure of same shapes, which are disposed at regular intervals along the advancing direction of incident light and have 90% or more transmittance. This is possible because, when incident light passes through plural structures having a same shape, the intensity of transmission resonance wavelength does not change, but the wavelength width continuously decreases.

The eleventh object of the invention is to provide a filter having various functions by appropriately utilizing shape resonance characteristics in an appropriate array structure of various shapes on a metallic layer.

To accomplish the above object, according to one aspect of the present invention, there is provided a filter having a high transmittance. The filter comprises: a substrate having a first surface and a second surface; and a periodic or random array of through-holes formed so as to pass through the first surface and the second surface, the through-hole having a size of subwavelength at a range of infrared and terahertz wave, wherein transmission resonance characteristic of incident light on the first surface is controlled by a shape of the through-hole.

Preferably, the substrate is formed of a material having free electrons.

Preferably, the material having free electrons includes a metal or a semiconductor.

Preferably, the filter exhibits a high transmittance capable of transmitting more than 90% of the incident light.

According to another aspect of the invention, there is provided a single resonance filter having a high transmittance. The resonance filter of the invention comprises: a substrate having a first surface and a second surface; and a periodic or random array of through-holes formed so as to pass through the first surface and the second surface, the through-hole having a size of subwavelength and a symmetrical shape with respect to polarization direction of incident light towards the first surface, wherein single transmission resonance characteristic of the incident light is controlled by a shape of the through-hole.

Preferably, the substrate is formed of a material having free electrons.

Preferably, the material having free electrons includes a metal or a semiconductor.

Preferably, the symmetrical shape includes a square shape, a rectangular shape, a circular shape, a slit shape, or a combination thereof.

Preferably, the rectangular shape changes a transmission resonance wavelength over a wide band of wavelength while maintaining a high efficiency of more than 90% by controlling a length thereof perpendicular to the polarization direction of the incident light.

Preferably, the rectangular shape exhibits non-variable omni-directional function regardless of an angle of the incident light with respect to the first surface since the length thereof perpendicular to the polarization direction of the incident light is adjusted to be made longer such that transmission resonance wavelength becomes far away from Rayleigh line due to periodicity.

Preferably, the symmetrical shape has a wavelength transformation function by varying the ratio of two lengths along two polarization directions of the incident light perpendicular to each other.

Preferably, the array of the through-holes having the symmetrical shape is configured such that same shapes are disposed at regular intervals along advancing direction of the incident light to thereby transmit more than 90% of quasi-monochromatic wavelength having a narrow line width among the incident light.

Preferably, the single resonance filter exhibits a high transmittance capable of transmitting more than 90% of the incident light.

According to another aspect of the invention, there is provided a multiple resonance filter having a high transmittance. The resonance filter comprises: a substrate having a first surface and a second surface; and a periodic or random array of through-holes formed so as to pass through the first surface and the second surface; the through-hole having a size of subwavelength and an asymmetrical shape with respect to polarization direction of incident light towards the first surface, wherein one or more single transmission resonance characteristics of the incident light is controlled by the asymmetrical shape of the through-hole.

Preferably, the substrate is formed of a material having free electrons.

Preferably, the material having free electrons includes a metal or a semiconductor.

Preferably, the filter exhibits a high transmittance capable of transmitting more than 90% of the incident light.

Preferably, the asymmetrical shape includes a cross shape, a triangular shape, a spiral shape, a horseshoe shape, an ∈ shape, or a combination thereof.

Preferably, the number of the resonance wavelength is controlled by rotating the polarization direction of the incident light at 90 degrees, thereby exhibiting one transmission resonance wavelength when the polarization of the incident light lies perpendicular to opening of the horseshoe shape and exhibiting two transmission resonance wavelengths when the polarization of the incident light lies horizontal to opening of the horseshoe shape.

Preferably, the opening of the ∈ shape has two transmission resonance wavelengths having different wavelength positions depending upon polarization direction of the incident light, thereby selecting wavelength.

Preferably, when resonance wavelength position controlled by the asymmetrical shape is far away relatively from surface plasmon resonance, the wavelength is not changed due to outstanding development of a shape resonance.

Preferably, in case of the two transmission resonance characteristics, one of the two wavelengths lies near Rayleigh line and the other one lies far away therefrom such that one is wavelength-variable with the incident angle of incident light and the remaining one is non-variable with wavelength, thereby providing wavelength variability and wavelength non-variability.

Preferably, the array structure of the asymmetrical shaped through-holes is configured such that same shapes are disposed in parallel at regular intervals along the advancing direction of the incident light so that quasi-monochromatic wavelength of narrow wavelength width in the incident light is transmitted more than 90%.

Preferably, three or more resonance wavelengths are obtained through a hybrid combination of the symmetrical or asymmetrical basic shapes.

Preferably, a shape having the hybrid combination and Rayleigh minima are appropriately combined to improve transmission characteristics.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
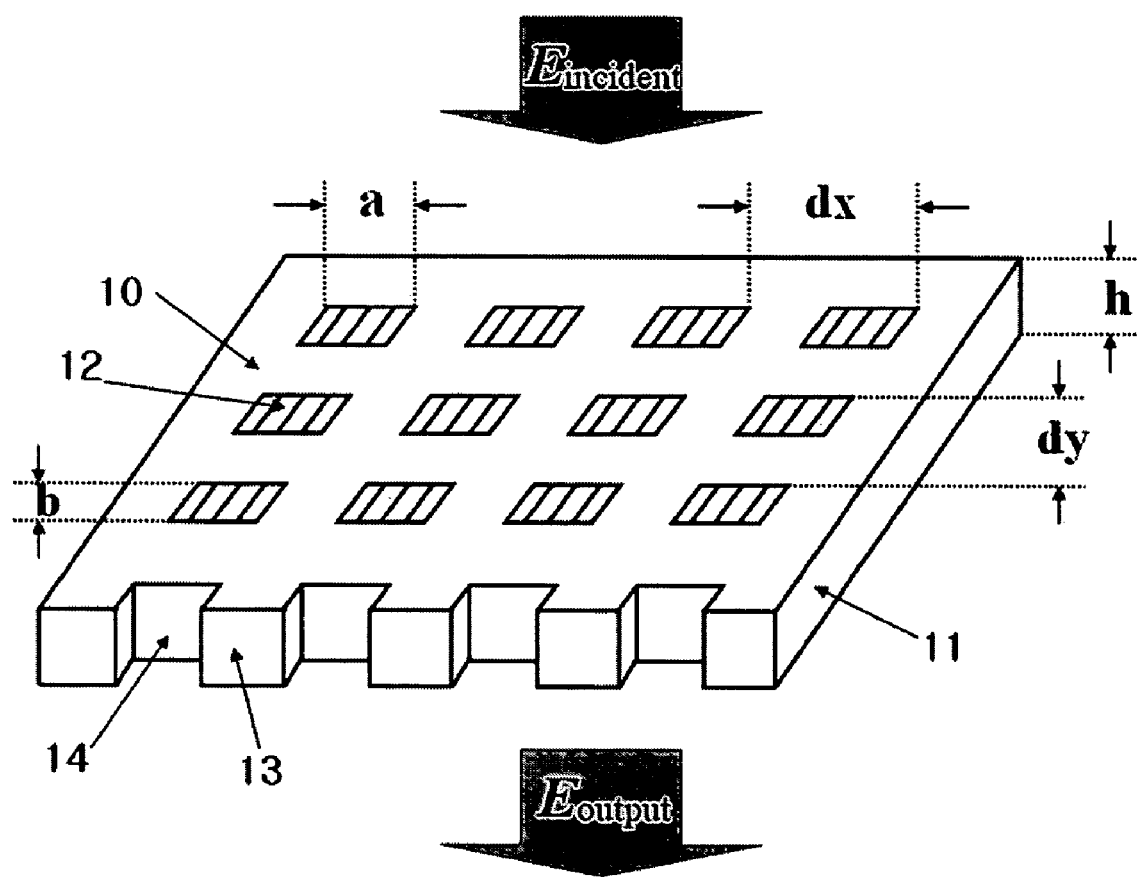
FIG. 1 is a perspective view of a periodic array of rectangular structures, which is one of basic shapes according to the present invention.

Hereafter, the features of the invention will be explained in greater detail.

The inventors have found more than 90% transmittance at a periodic and random array structure of through-holes having various shapes on a metallic layer. It has been confirmed that transmission in this structure can be appeared in various ways depending upon the shapes of the through-hole.

The periodic array formed along the polarization direction of incident light towards the metallic layer has been achieved by the structure of through-holes having various shapes. The shape of the through-hole can be divided into a symmetric structure and an asymmetric structure. The symmetric structure includes a circular shape, a square shape, a rectangular shape, a slit form or a combination thereof. A typical asymmetric shape includes a horseshoe-shape, an epsilon shape, or an appropriate combination thereof. More than 90% transmission characteristic has been found with respect to the through-hole structure of various shapes having these periodic array structures.

It is observed in a rectangular structure that a specific wavelength, at which a transmission resonance occurs, is continuously lengthened as continuously extending the length perpendicular to the polarization direction of incident light. (Both extreme cases of a rectangular are a square and a slit respectively. In the present invention, the continuous change of a rectangle includes a square structure and a slit structure.) It has been confirmed that the transmittance remained more than 90% while the wavelength is continuously changed.

In the above case, it has been found out that the wavelength, at which a transmission resonance occurs, is determined by two conditions. First, in case where the rectangle is relatively extended along the perpendicular direction to the polarization direction (here, the transmission resonance occurs at a long wavelength.), the transmission resonance wavelength corresponds almost to twice the length of the rectangle. This means that a shape resonance is an important factor to determine the resonance wavelength. Second, when the length of a rectangle is relatively short, or equivalent to a square, the transmission resonance wavelength approaches Rayleigh line, which is an effect of periodicity, and then starts to bend along the Rayleigh line. This means that a surface plasmon resonance is an important factor to determine a resonance wavelength.

In a rectangle through-hole structure, when the length of each direction is made different appropriately, it is found to exhibit different resonance wavelengths according to the polarization direction of incident light. (The experiment of this invention has been carried out with a rectangle having a ratio of 2:3.)

According to the result from the experiment of the above various rectangular structures, it has been confirmed that the resonance wavelength is determined by the length of the rectangle perpendicular to the polarization direction of incident light. Thus, in case of a rectangle having a different ratio of two directions, the resonance wavelength becomes different, depending on the direction where the polarization direction of incident light lies on the rectangular shape. That is, if the polarization direction is changed by 90 degrees, the resonance wavelength is switched 100%.

In case of an elongated rectangle or a slit, the length along the polarization direction of incident light (width) does not significantly affect the transmission resonance wavelength or the transmission characteristics. Thus, it is found out that, even in case of an extremely narrow length of this direction, almost similar transmittance or a resonance wavelength is exhibited. This means that even in the case where the filling factor of a shape structure filling above a metallic layer is no more than 10%, 90% or more transmittance is obtained.

With respect to a rectangular shape having a longer length along the perpendicular direction to the polarization direction of incident light, it is found that most non-periodic array, i.e., random arrays exhibit 90% or more transmittance. That is, in case of a special case, it has been found that 90% or more transmittance may be occurred, regardless of whether the basic shapes constituting a structure are arrayed periodically or non-periodically. This phenomenon is exhibited when a shape resonance is relatively far away from a surface plasmon resonance.

An incident angle-dependent transmission was measured, with respect to a rectangular shape having a longer length along the perpendicular direction to the polarization direction of incident light. In this case, it has been confirmed that the longer the length becomes, the less the transmission resonance wavelength changes with respect to the incident angle of incident light on the metallic layer. In case of a square shape, however, it has been found that the transmission resonance wavelength depends significantly upon the incident angle of incident light. It has been discovered in this case that, as the incident angle becomes larger and larger, the transmission resonance wavelength continues to move towards the longer wavelength band. This phenomenon is determined, depending upon how the shape resonance is affected by a surface plasmon resonance. That is, in case of a square, where the shape resonance is close to Rayleigh line by periodicity, the bending of Rayleigh line is strongly recognized (i.e., a change in momentum with variation of the incident angle of incident light is strongly recognized.). In contrast, in case of an elongated rectangle, two incidents of resonance lie relatively far away from each other, and thus the change in Rayleigh line cannot be strongly recognized.

In a symmetrical array structure such as a rectangle, a circle, a slit or a square, it has been discovered that only one outstanding transmission resonance is exhibited respectively.

On the contrary, in an asymmetrical array structure such as a horseshoe or an ∈ shape, it has been found that one or more outstanding transmission resonance wavelength is appeared. In case of a horseshoe shape, it has been found that, where the polarization of incident light lies perpendicular to the opening of the horseshoe, one transmission resonance wavelength is appeared. However, in case where it lies parallel with the opening of the horseshoe, two transmission resonance wavelengths are found to be exhibited. This case shows a noticeable transmittance, i.e., one of them shows 90% or more and the other one 80% or more transmittance. Two transmission resonance wavelengths occur through development of two basic modes of a through-hole shape. Where the basic shape is symmetrical, the first mode is made outstanding, but where asymmetrical, two modes are developed outstanding at the same time.

In case of an ∈ shape, two outstanding transmission resonance wavelengths are appeared. In this case, dissimilar to the case of a horseshoe, two transmission resonance wavelengths are exhibited in both cases of being perpendicular to the polarization of incident light. In case of a horseshoe or ∈ shape, it has been confirmed that the transmission resonance wavelength can be controlled through variations in the size, length or pattern of the shape.

Among the two typical asymmetrical structures used in the experiment of the invention, in the case of a horseshoe shape, one of the transmission resonance wavelengths lies close to Rayleigh line and the other one lies quite far away therefrom. Thus, the former has a strong dependency on the incident angle of incident light and the latter has a weak dependency. Accordingly, it has been confirmed that one of them becomes wavelength-variable and the other one becomes wavelength-nonvariable. In the case of an ∈ shape, two transmission resonance wavelengths both are far away from the Rayleigh line and thus are rarely affected by the incident angle of incident light. Accordingly, it is found to be made omni-directional. It can be seen from this that, even in the case of two transmission resonance wavelengths, wavelength variability can be controlled according to changes in the incident angel of incident light.

In the present invention, the same experiments have been performed with respect to various other asymmetrical shapes such as a cross, a triangle, a spiral shape or the like, in addition to the above typical two shapes. These cases have been found out to exhibit similar characteristics to the previous cases.

For the above various shapes having 90% or more transmittance, in case where the same shapes (two or more) are disposed at regular intervals along the advancing direction of incident light, the spectral width can be decreased gradually while maintaining almost the same the intensity as that of the transmission resonance wavelength. Namely, it has been discovered that a transmission wavelength close to almost quasi-monochromatic wave can be achieved.

Various through-hole structures of basic shapes are arrayed periodically on a metallic layer, thereby having achieved a transmission characteristic having plural resonance wavelengths. (Here, the inventors have used a periodic through-hole array where rectangular shapes having three different lengths are periodically arranged.) The periodic array of three rectangular shapes having different lengths shows a variety of periodicity at plural wavelength positions on the spectrum. It has been confirmed that four transmission resonance wavelengths can be achieved through an appropriate arrangement of the Rayleigh line and a shape resonance. It has also been confirmed that, besides these structures, through-holes having other basic shapes may be arrayed periodically to design various transmission characteristics.

Various transmission characteristics at terahertz or infrared region, which are obtained by a periodic or random array of through-holes having various shapes formed on a metallic layer, can be applied to various filter applications.

Hereafter, the preferred embodiments of the invention will be described in detail, with reference to the accompanying drawings.

FIG. 1 is a perspective view of a periodic array of rectangular through-holes, which is one of basic shapes according to embodiments of the present invention. Other shapes of the invention are also arranged in the same pattern as in FIG. 1. This filter is composed of a first surface 10 and a second surface 20 (not illustrated), a lateral face 11 and an interior, all of which are formed of an optically thick metallic layer. The rectangular through-hole 12 and other various shaped through-holes (which will be described hereafter) are formed through a laser machining method based on the femtosecond laser technology. The laser machining method can be used for forming various shapes having a width of at least 30 microns. Above the first surface or blow the second surface, a desired dielectric material, typically air, can be filled in the through-hole 12 formed through the laser machining method. The transmission characteristics are determined according to the type of dielectric material filled in the through-hole. The cross-sections 13 and 14 of the through-hole 12 formed by the laser machining method show a rectangular configuration, as shown in the figure. The lengths a and b of the through-hole along the two directions of the rectangular metallic layer and the periodicity dx and dy can be controlled through variations in the design drawing for the laser machining.

Figure 2:
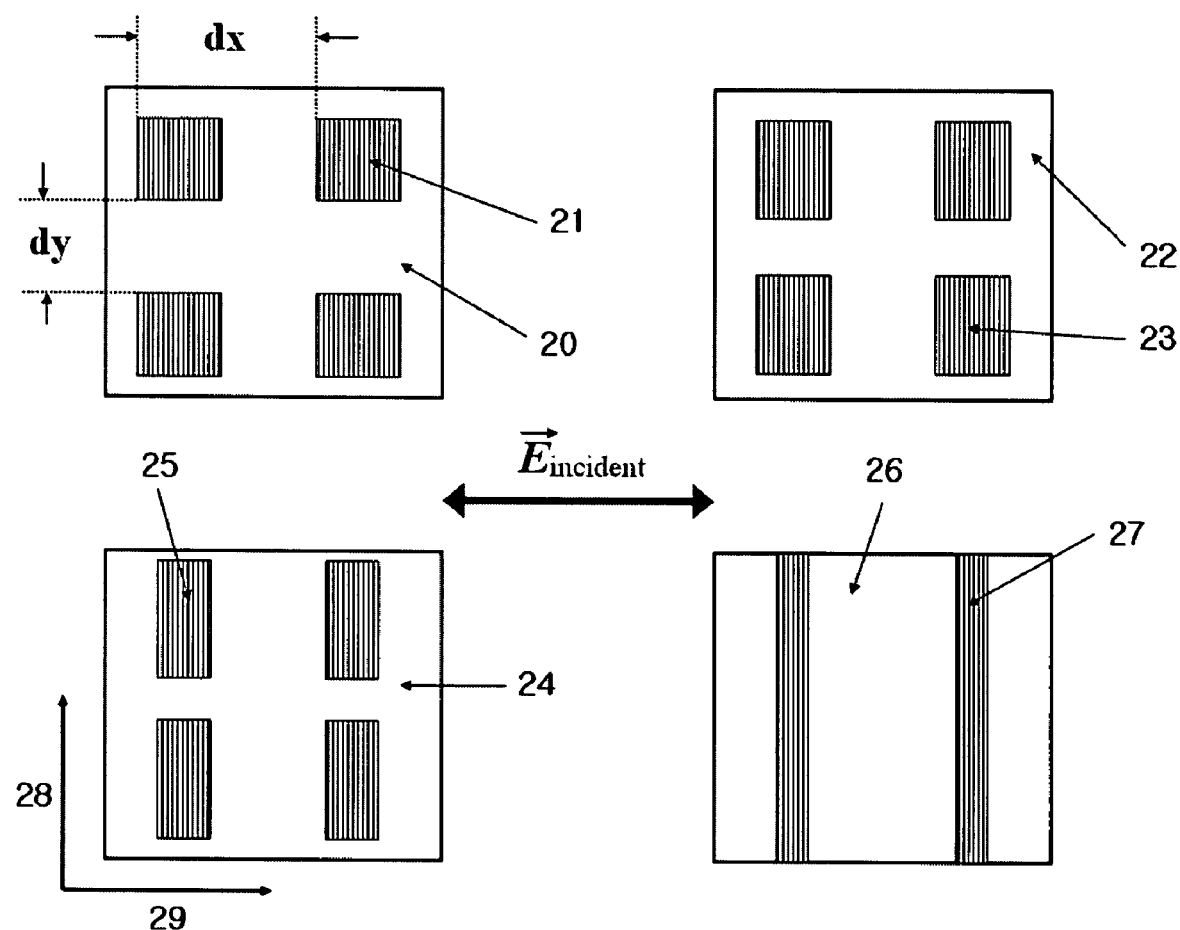
FIG. 2 is a plan view showing various shapes from a square shape via a rectangular shape to a slit form.

FIG. 2 is a plan view showing various shapes from a square shape via a rectangular shape to a slit form. For the following explanation, coordinate axes need to be defined on the metallic layers 20, 22, 24 and 26. For example, the transversal direction 29 is defined as an x-axis and the vertical direction 28 is defined as an y-axis. Since polarization direction of incident light lies on the x-axis, the periodicity of array structure is recognized along the x-axis. Thus, the period dx along the x-axis is fixed and the shape of the through-hole 21, 23, 25, 27 is extended gradually along the y-axis direction finally until a slit is formed.

Figure 3:
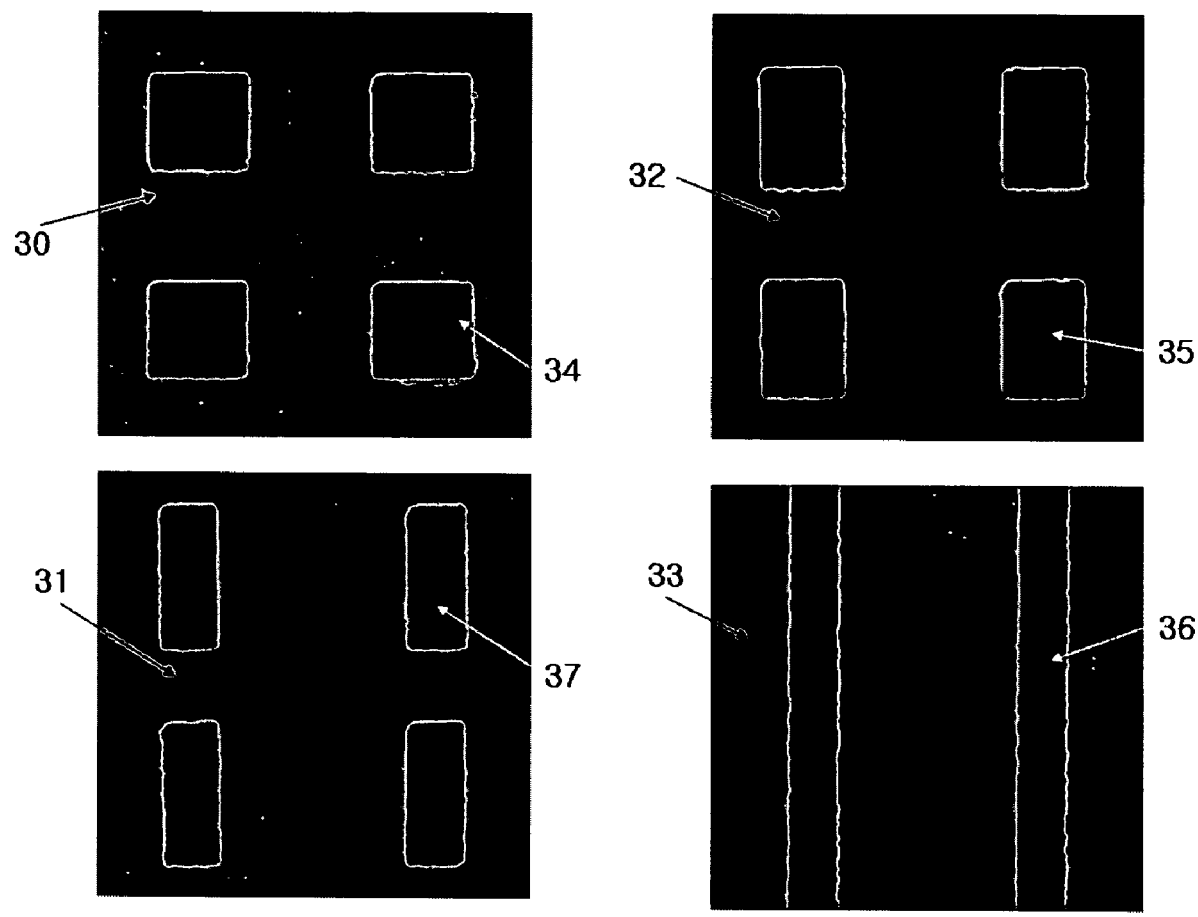
FIG. 3 illustrates a filter structure manufactured based on the perspective view of FIG. 2.

The structures of filters manufactured based on the perspective view of FIG. 2 is illustrated in FIG. 3. Using a laser machining method, through-hole structures having the characteristics of FIG. 2 are realized on the metallic layers 30, 31, 32 and 33. FIG. 3 is SEM photographs, from which the laser machining method is found to have an excellent performance capable of forming these through-hole structures.

Figure 4:
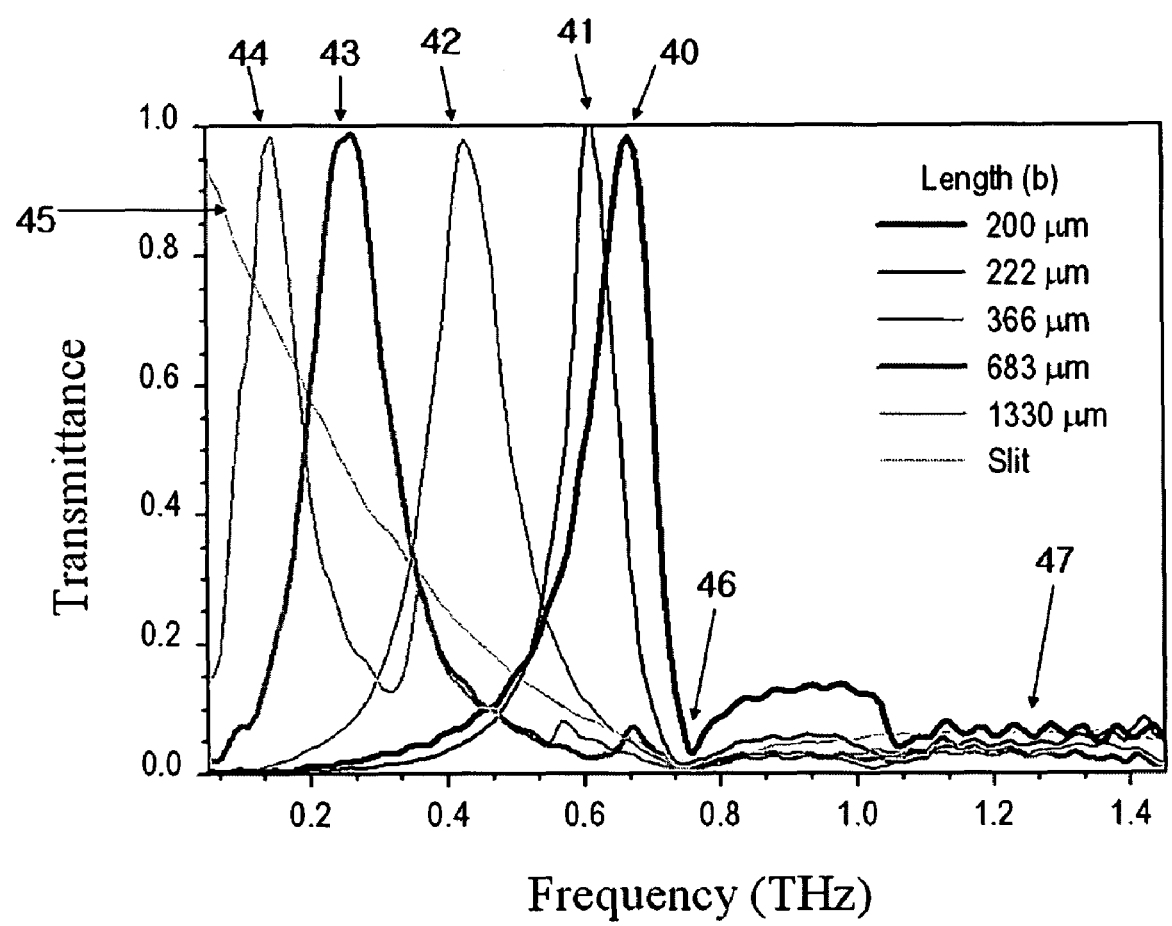
FIG. 4 shows transmittance with respect to rectangular structures where y-axis length varies as shown in several examples of FIGS. 2 and 3.

FIG. 4 shows transmittance with respect to rectangular structures where y-axis length varies as shown in several examples of FIGS. 2 and 3. The square shape array structure having a length of 200 microns exhibits the shortest transmission resonance wavelength 40, which corresponds to 90% or more transmittance. As the y-axis length of the rectangular is increased, the position of its transmission resonance wavelength moves towards a longer wavelength range in the order of 40→41→42→43→44→45. (Of course, the transmittance remains over 90% in all the cases.) It shows that the length of the rectangular is in a close relation with transmission resonance wavelength and shows a resonance characteristic where the y-axis length determines the position of transmission resonance wavelength. Since all the structures used in this experiment have an x-axis period of 400 microns, Rayleigh line 46 due to the periodicity occurs at 0.75 THz. From this point over the short wavelength band 47, transmission barely occurs because the accumulated surface wave formed on the surface of the metallic layer decreases. Using the surface wave characteristic and the shape resonance characteristic on such a metallic layer, it has been found that a unique transmission wavelength is formed in an array structure of the rectangular shape, a square shape and the slit form.

Figure 5:
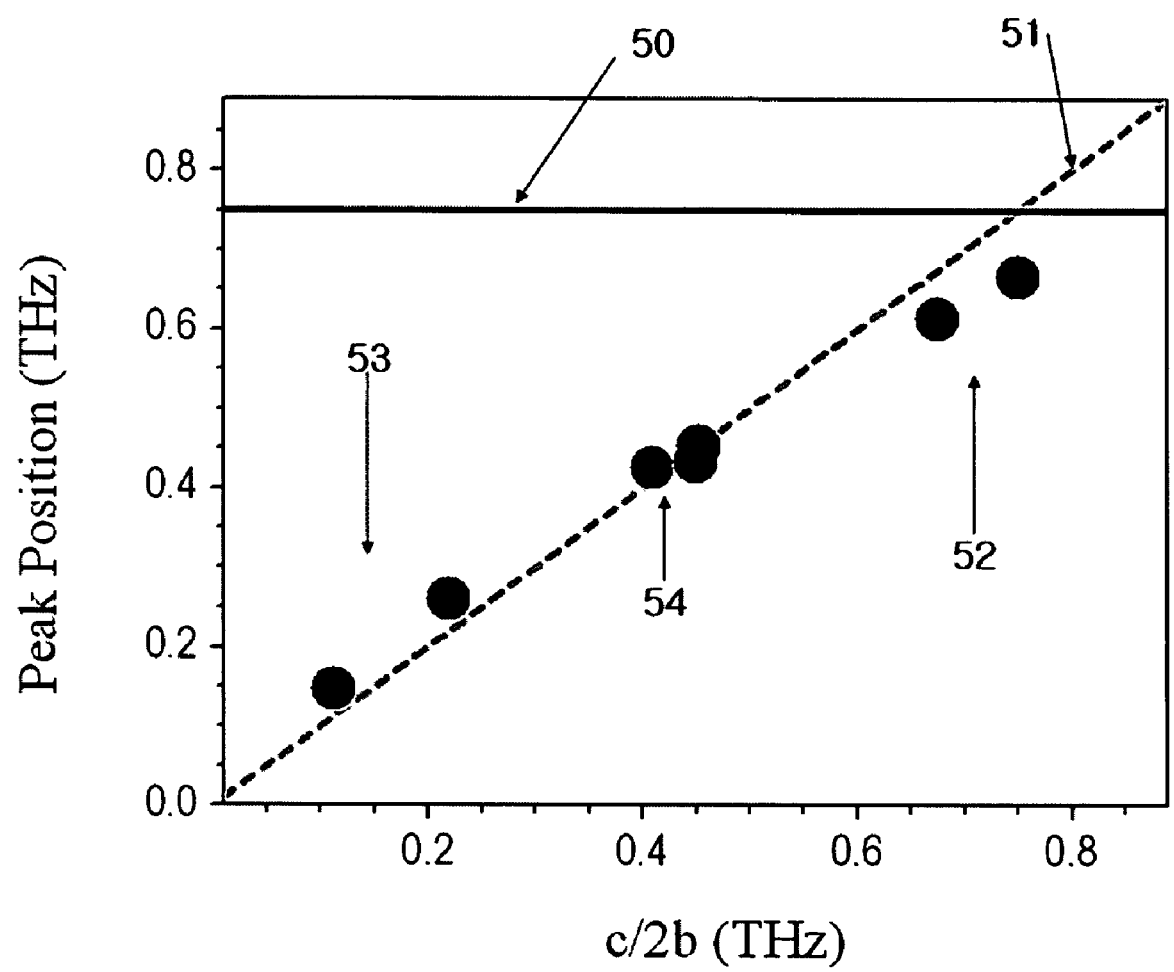
FIG. 5 shows a comparison of transmission resonance positions with cut-off frequencies.

The transmission resonance wavelength position can be compared with a cut-off frequency, as explained in FIG. 5. The cut-off frequency line 51 is intersected with the Rayleigh line 50 (due to periodicity) at 0.75 THz. A transmission resonance wavelength 53, 54 relatively far from the intersection is generated along the cut-off frequency line, but in contrast a transmission resonance wavelength 52 close to the above intersection is bent along the Rayleigh line 50. This means that, if a transmission resonance wavelength is far away from the Rayleigh line 50, it is controlled more dominantly by the shape resonance characteristics.

Figure 6:
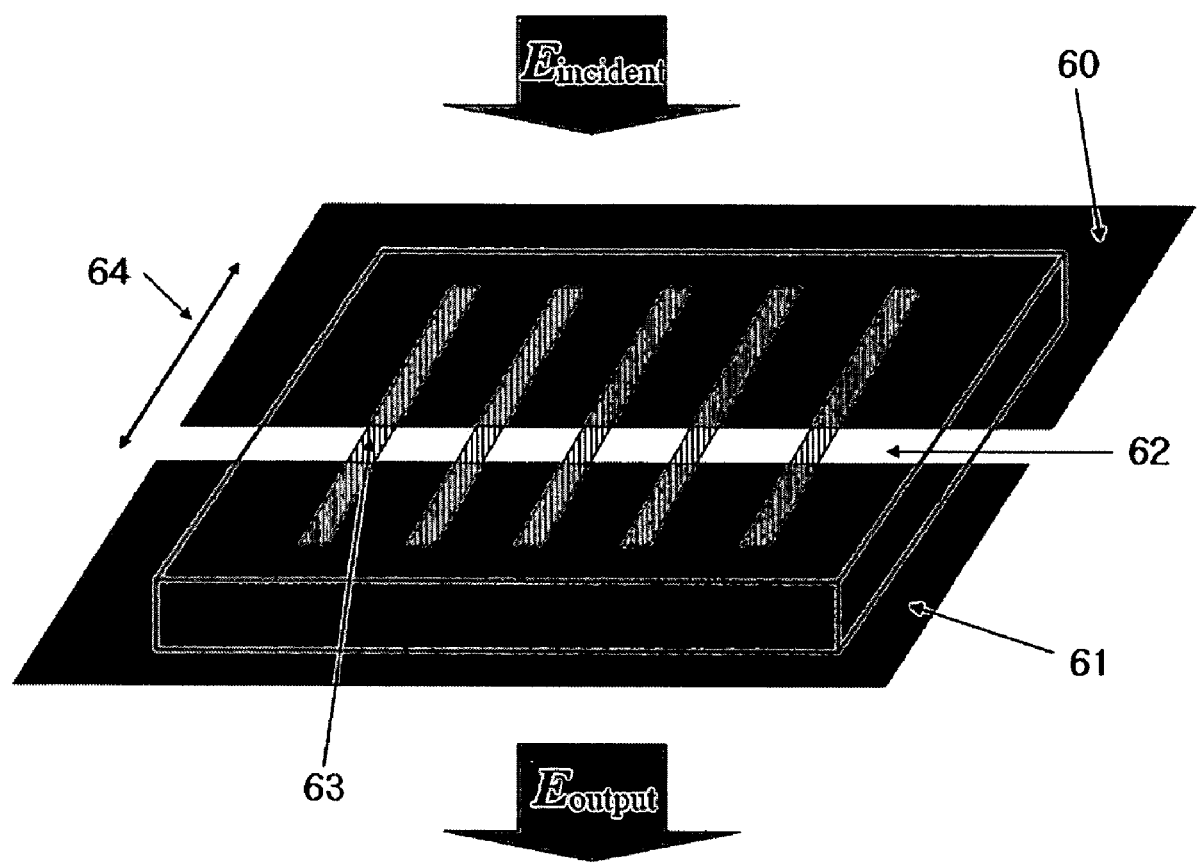
FIG. 6 is a perspective view of a wavelength-variable filter as a further applicability according to the experimental results of FIGS. 4 and 5.

Based on the experimental results from FIGS. 4 and 5, another application can be proposed, i.e., the present invention can be applied to a variable filter, a perspective view of which is illustrated in FIG. 6. An array structure of slits 63 is formed on a metallic layer 62, which has a first surface and a second surface. Two thin metallic layers 60 and 61 are placed on the first surface. One metallic layer 61 is fixed and the other metallic layer 60 is adjusted along the indicated direction 64 such that incident light can continuously recognize the variations in the length of the rectangular shape perpendicular to its own polarization direction to thereby obtain a transmission resonance wavelength, which is continuously variant as shown in the experimental results of FIGS. 4 and 5.

Figure 7:
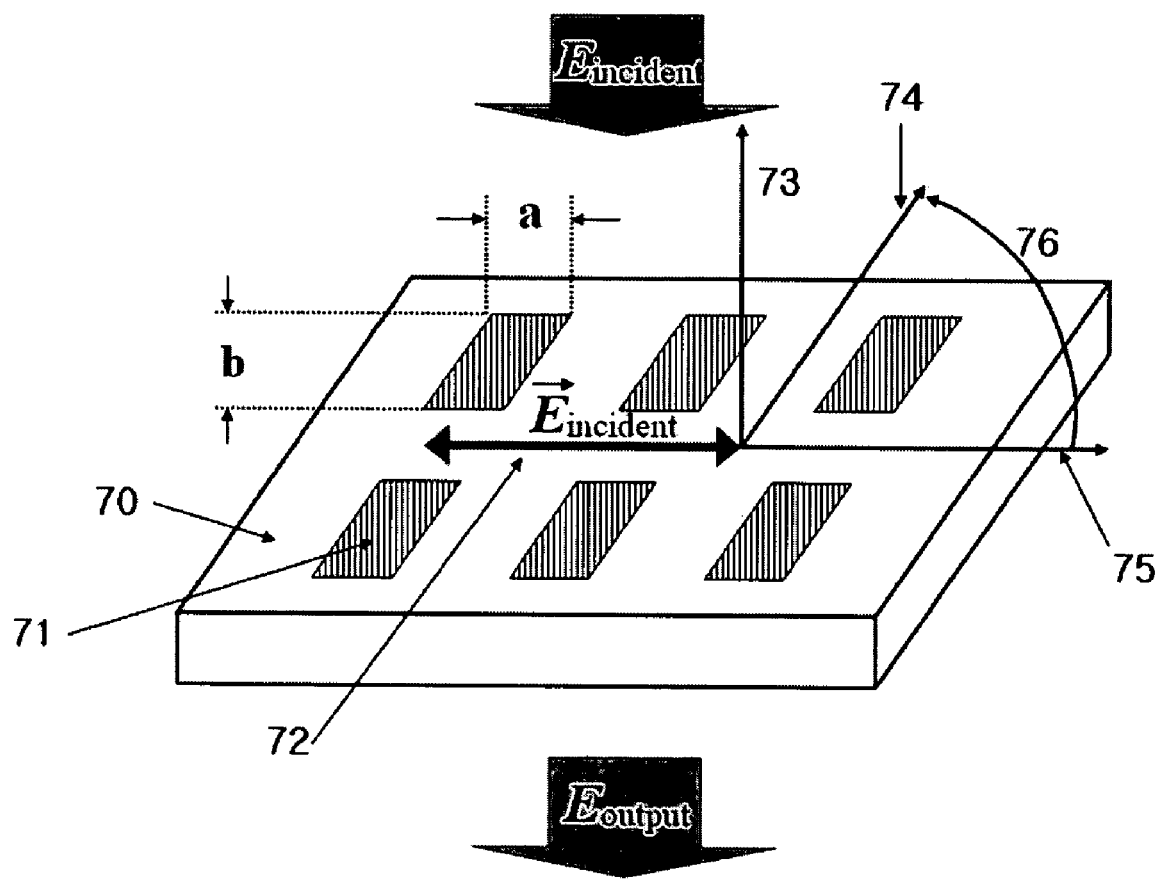
FIG. 7 shows a perspective view of a wavelength switching filter through variation of polarization direction by rotation on the metallic plane in an array structure of rectangular shapes formed in a metallic layer where the lengths a and b along the horizontal direction and the vertical direction respectively are different from each other.

FIG. 7 shows a perspective view of a wavelength switching filter through variation of polarization direction 72 by rotation on the metallic plane in an array structure of rectangular shapes 71 formed in a metallic layer 70. In the rectangular shape 71 of FIG. 7, the lengths a and b along the horizontal direction 75 and the vertical direction 74 respectively are different from each other. The above structure can switch selectively two different wavelengths by rotating at 90 degrees from the horizontal direction 75 towards the vertical direction 74 about an axis 73 normal plane.

Figure 8:
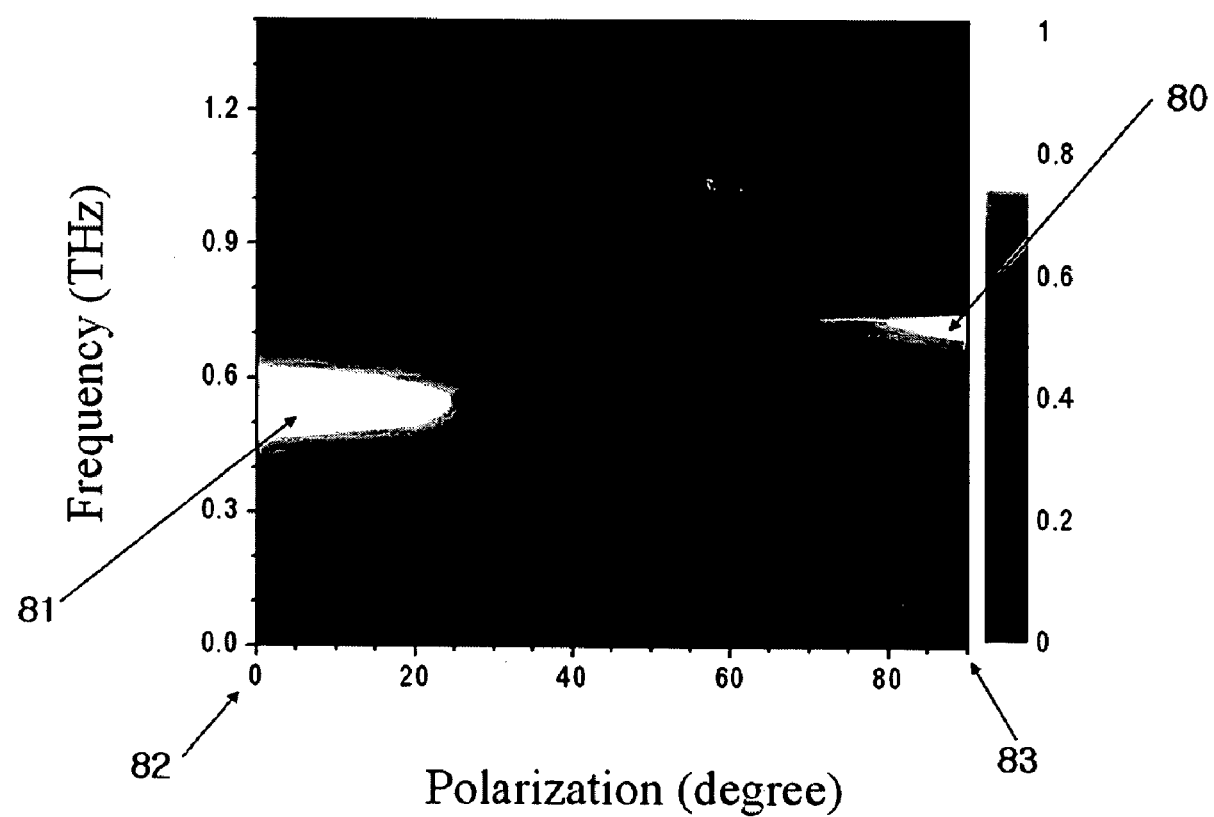
FIG. 8 shows transmission characteristics for the degree of polarization in the structure of FIG. 7.

FIG. 8 shows transmission characteristics for the degree of polarization in the structure of FIG. 7. When the polarization of incident light lies on the horizontal direction 75 in FIG. 7, a transmission resonance wavelength indicated at 81 in FIG. 8 occurs. When the polarization of incident light lies on the vertical direction 74, a transmission resonance wavelength indicated at 80 in FIG. 8 occurs. The polarization directions are indicated at 82 (zero degree) and 83 (90 degrees). The intensity of the transmission resonance wavelength occurring at zero and 90 degrees respectively is more than 90% and the two wavelengths can be switched through rotation of the filter structure. In the rectangular shape used in this experiment, the lengths a and b are 200 and 300 microns respectively. The lengths can be designed appropriately so as to achieve a wavelength switching filter having different transmission resonance wavelengths.

Figure 9:
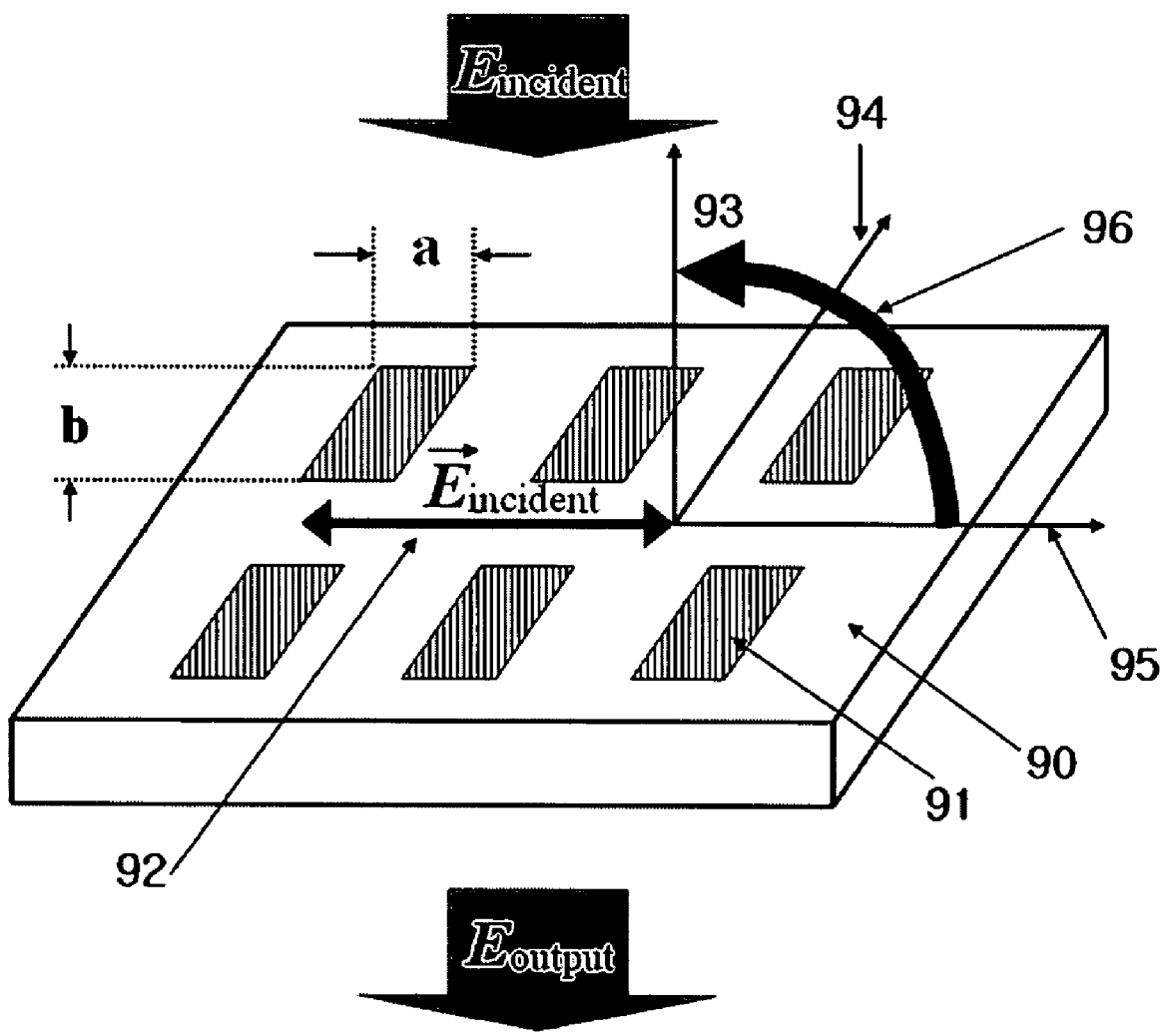
FIG. 9 is a schematic diagram showing omni-directional and continuous wavelength-variable filter function depending upon incident angle of the incident light in a rectangular shape.

FIG. 9 is a schematic diagram showing omni-directional and continuous wavelength-variable filter function depending upon incident angle of the incident light in a rectangular shape. The experiments of the invention employed a rectangular structure having various ratios of a and b. The rectangular shape 91 formed on a metallic layer 90 exhibits a transmission characteristic having a unique function by being rotated towards the advancing direction of the incident light from a direction 95 horizontal to the polarization direction 92 of the incident light. More specifically, the rotation of the filter is carried out with respect to a direction 94 perpendicular to the polarization direction 92 of the incident light.

Figure 10:
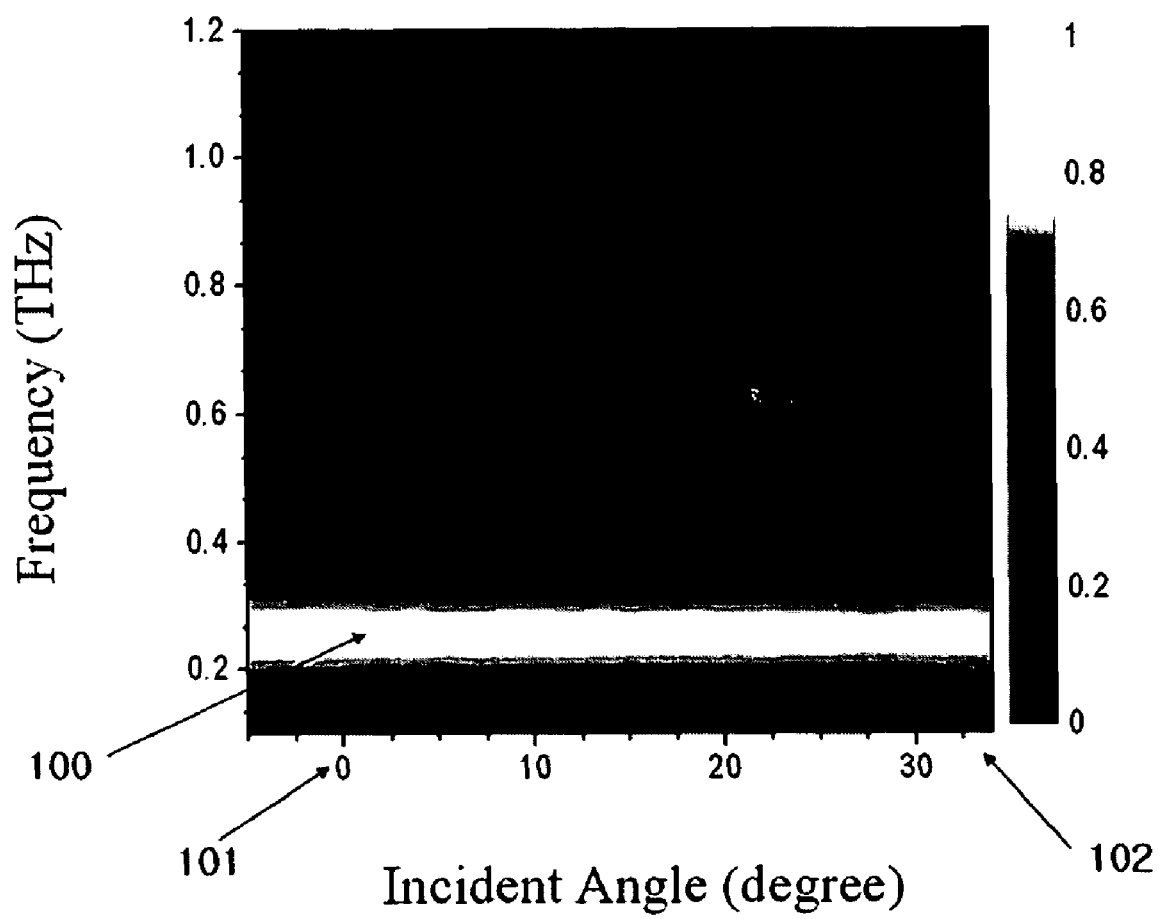
FIGS. 10 and 11 show transmission characteristics depending upon incident angles of incident angle in the structure of the perspective view of FIG. 9.
Figure 11:
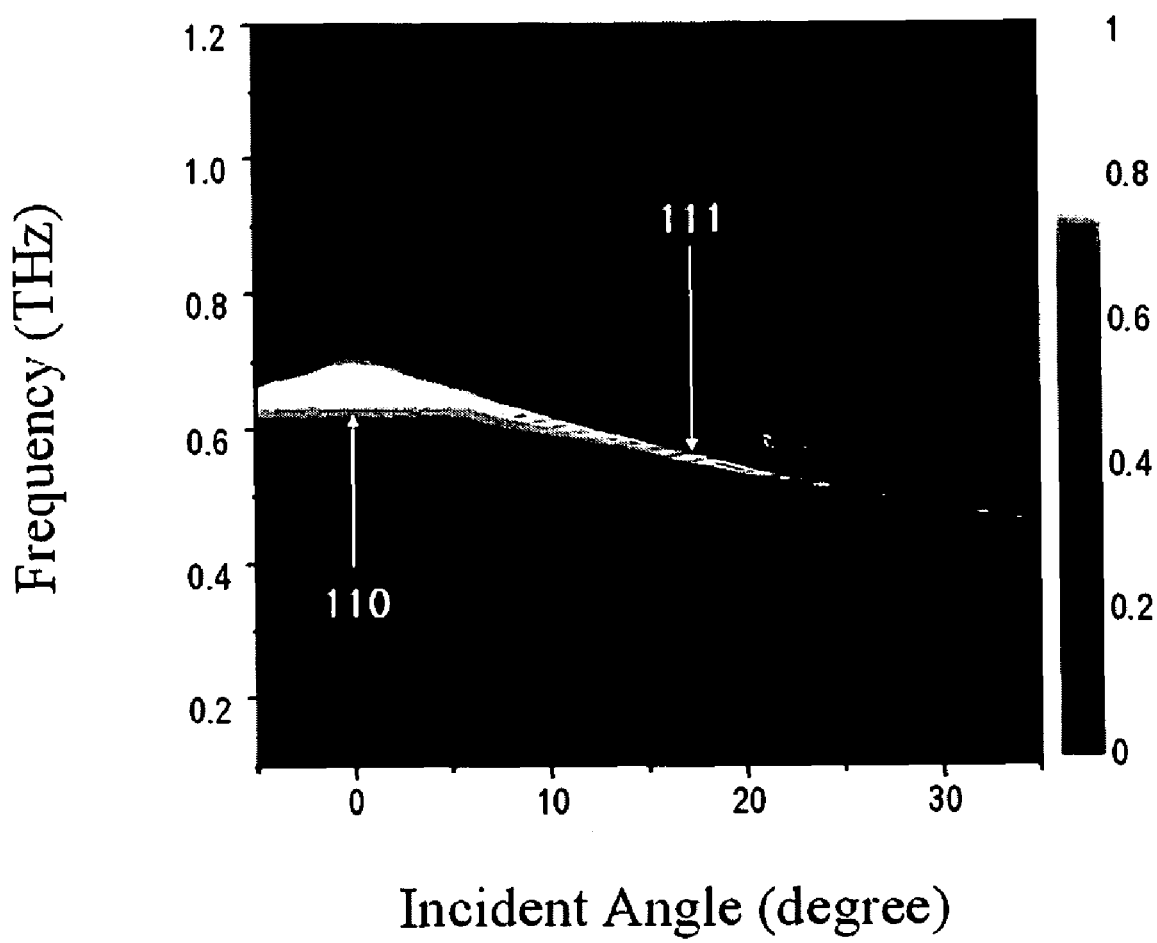

FIGS. 10 and 11 show transmission characteristics depending upon incident angles of incident angle in the structure of the perspective view of FIG. 9. The experimental results of FIG. 10 corresponds a case where b is 683 microns, a is 85 microns and the periodicity of polarization direction is 400 microns. In this case, since the transmission resonance wavelength 100 is far away from Rayleigh line towards a long wavelength band, it is rarely affected by the Rayleigh line caused by the periodicity, but affected by a shape resonance only. Thus, even if the incident angle of incident light is changed from zero degree 101 until 35 degrees 102, the transmission resonance wavelength position is not changed. This shows the function of an omni-directional filter using a shape resonance. In contrast, in case of a rectangular shape having the same length of a and b (200 microns for both), the transmission characteristic with respect to the incident angle of incident light is completely different as shown in FIG. 11. At the incident angle of near zero degree, the transmission resonance wavelength by a shape resonance is appeared right below the Rayleigh line (110). On the contrary, as the incident angle is slightly changed, the transmission resonance wavelength begins to recognize strongly the Rayleigh line by the periodicity and moves towards a long wavelength band (111). This means that a filter capable of continuously adjusting a wavelength can be realized by adjusting the incident angle of incident light in an appropriately designed rectangular shape.

Figure 12:
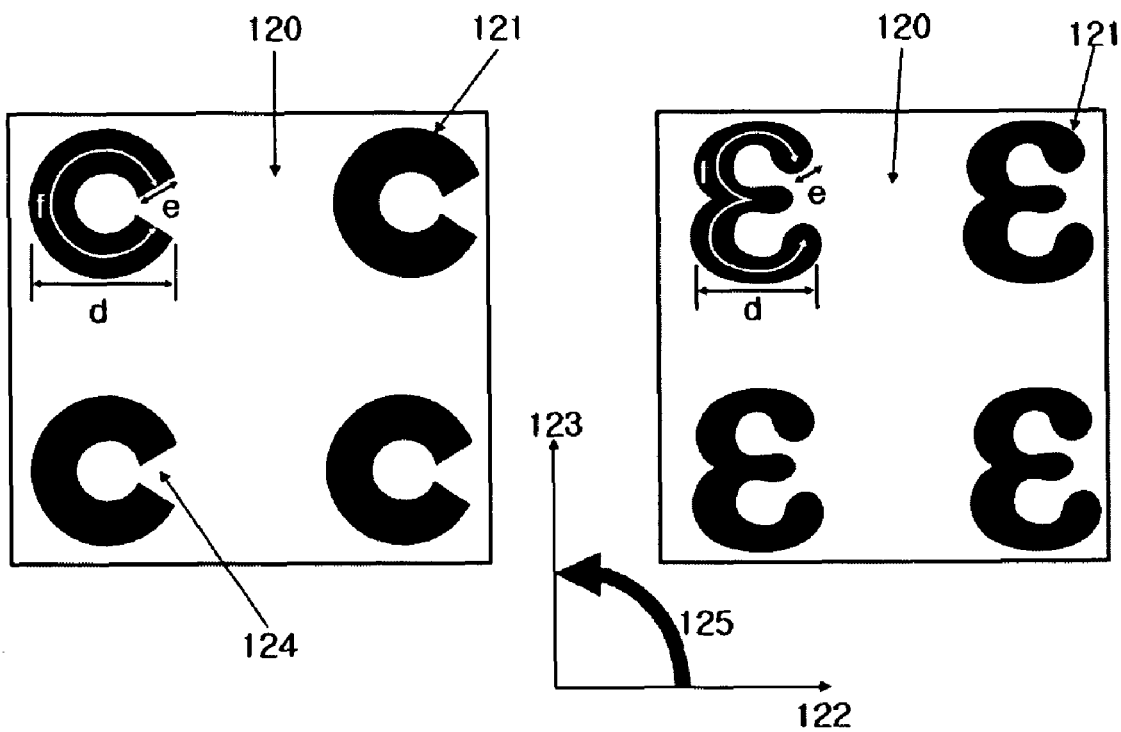
FIG. 12 shows a perspective view of a horseshoe shape and an ∈ shape, which are a typical example of an array structure having an asymmetrical shape with respect to the polarization direction of incident light.
Figure 13:
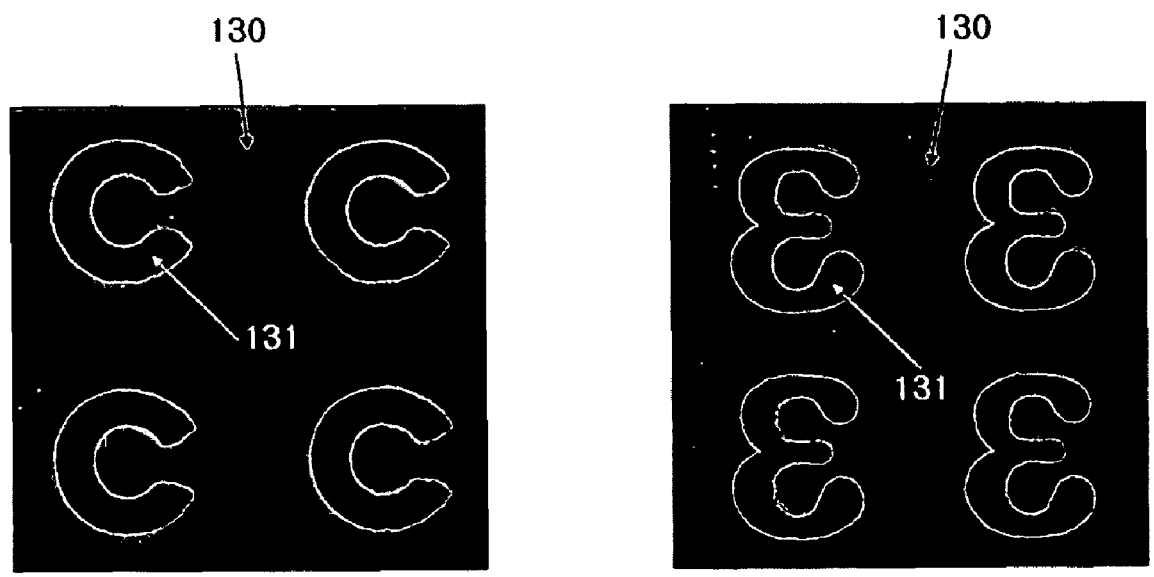
FIG. 13 is a SEM photograph showing a filter fabricated based on a shape designed on a metallic layer through a laser machining method.

FIG. 12 shows a perspective view of a horseshoe shape and an ∈ shape, which are a typical example of an array structure having an asymmetrical shape with respect to the polarization direction of incident light. The shape 121 designed on a metallic layer 120 can be fabricated using a laser machining method and FIG. 13 is a SEM photograph showing a fabricated filter based on this design. As can be seen in the SEM photograph, the shapes 131 perforated in the metallic layer 130 is formed as the same as in the design of the drawing. These asymmetrical shapes can generate a desired transmission resonance wavelength position, the number of the transmission resonance wavelengths, the polarization of each transmission resonance wavelength, and dependency on the incident angle of incident light, through an appropriate variation in the length d, the width e and the total length f in FIG. 12.

Figure 14:
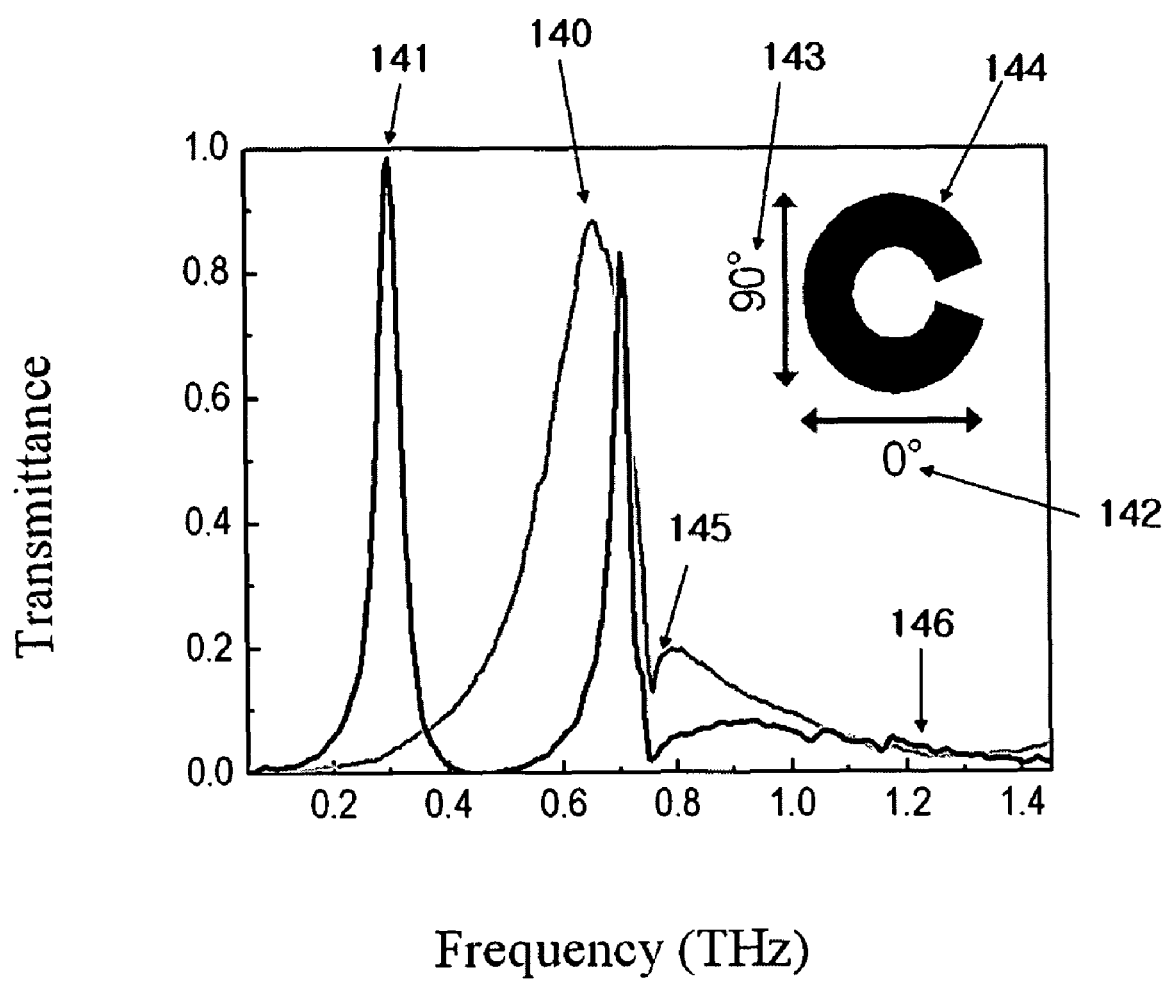
FIG. 14 shows the polarization characteristics of transmission resonance wavelength with respect to an array structure of horseshoe shapes.

FIG. 14 shows the polarization characteristics of transmission resonance wavelength with respect to an array structure of horseshoe shapes in FIG. 12. In FIG. 12, the horizontal direction 122 was defined as a reference zero degree 142, and the polarization of incident light was determined as 90 degrees through rotation 125 of a filter structure on a plane of two directions 122 and 123. When the polarization of incident light is at zero degree, it lies parallel to the open entrance 124 of the horseshoe shape in FIG. 12. In this case, the transmission characteristic at Tera region is shown at 141 in FIG. 14.

In this case, the polarization of incident light strongly recognizes the asymmetry of the horseshoe structure to thereby exhibit two outstanding transmission resonance wavelengths. However, the 90-degree rotation of the polarization direction exhibits a different transmission characteristic. In this case, only one transmission resonance wavelength 140 occurs since the polarization in this direction cannot recognize the asymmetry of the filter shape properly. In both cases, however, the periodicity of 400 microns in this experiment is exhibited as Rayleigh minima 145. In addition, as moving towards a short wavelength band, the outstanding transmission resonance no longer occurs due to a rapid decline in the surface field on the metallic layer.

Figure 15:
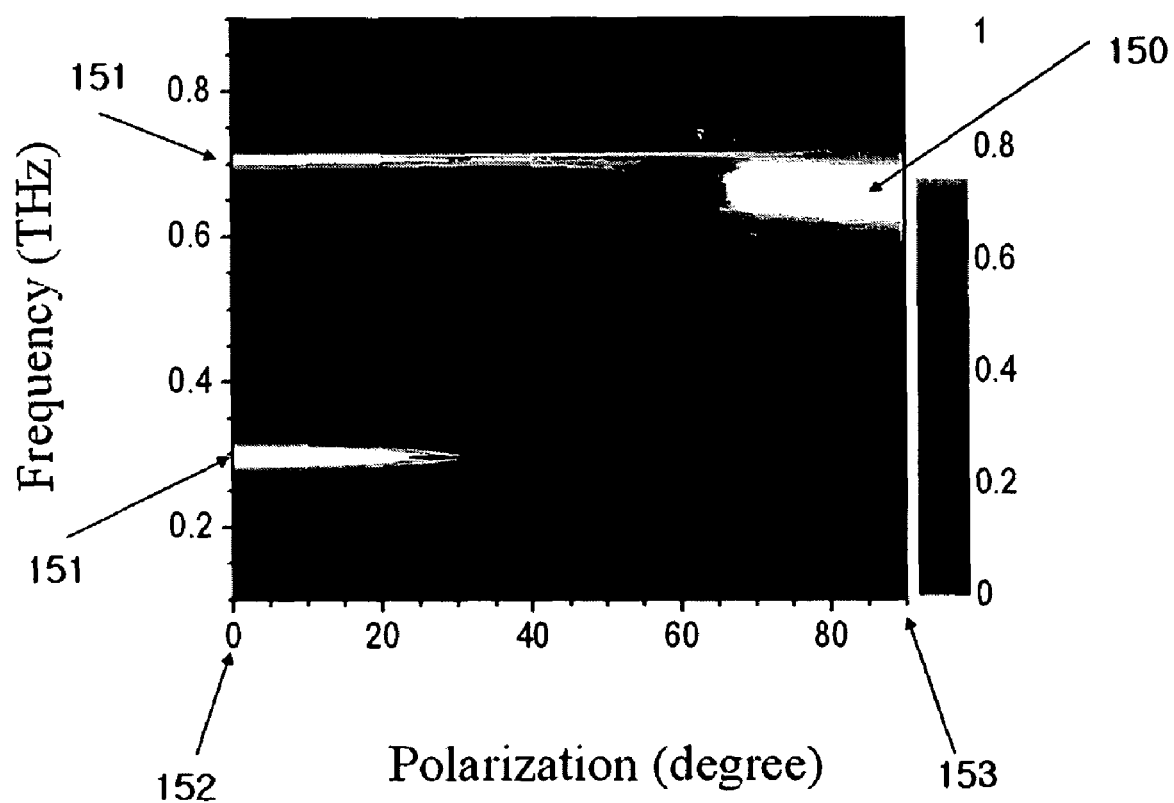
FIG. 15 shows variations in the transmittance with the polarization of incident light with respect to the array structure of the horseshoe shapes.

FIG. 15 shows variations in the transmittance with the polarization of incident light with respect to the array structure of the horseshoe shapes. Here, two extreme ends 152 and 153 of polarization correspond to 142 and 143 respectively in FIG. 14. As can be seen in FIG. 15, the transmission characteristic is changed for polarization in such a way that two different resonance wavelength positions are switched at two vertical polarizations and two resonance wavelengths 151 and 152 is switched into one resonance wavelength 150. Thus, it shows a possibility of achieving a filter capable of switching the number of resonance wavelengths, along with wavelength switching.

Figure 16:
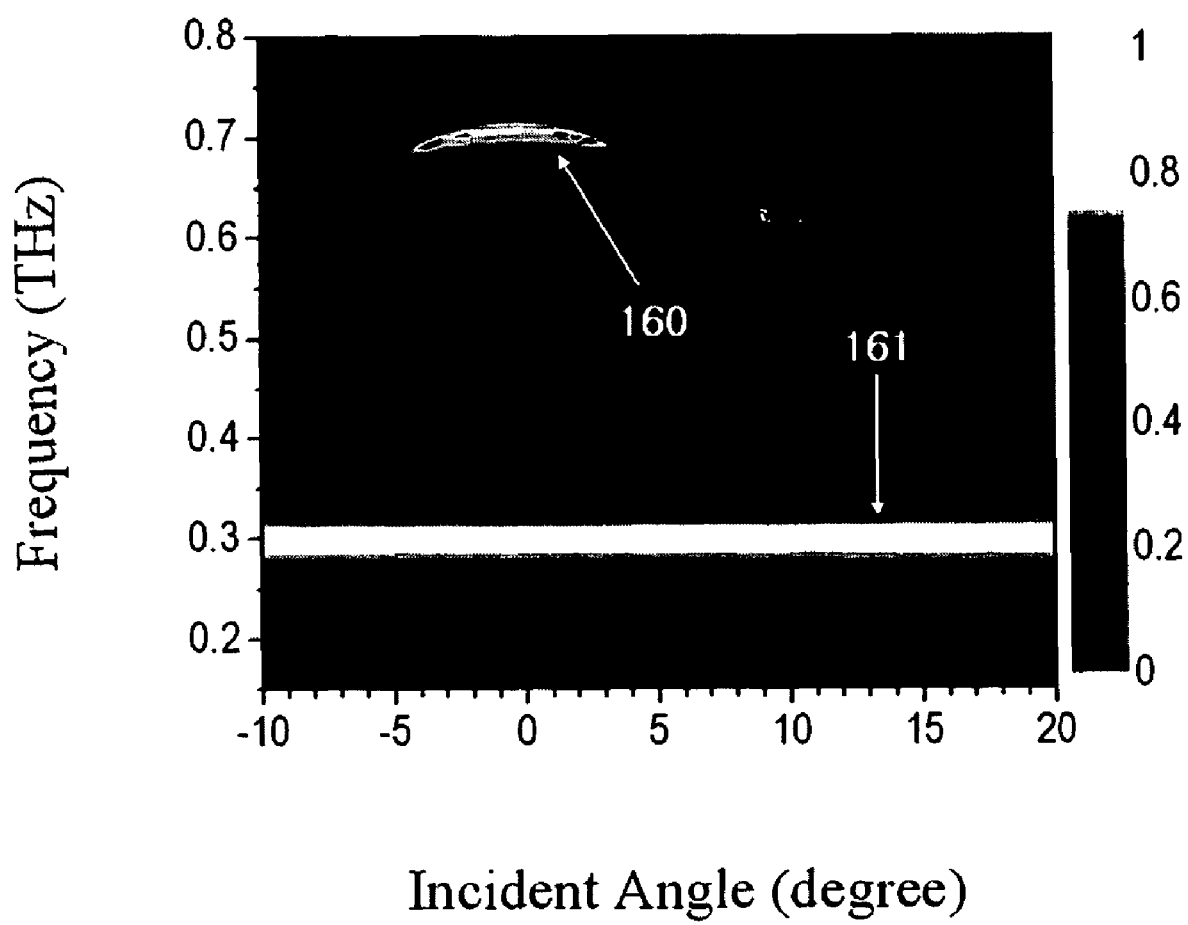
FIG. 16 shows dependency on the incident angle of incident light with respect to the array structure of horseshoe shapes.
Figure 17:
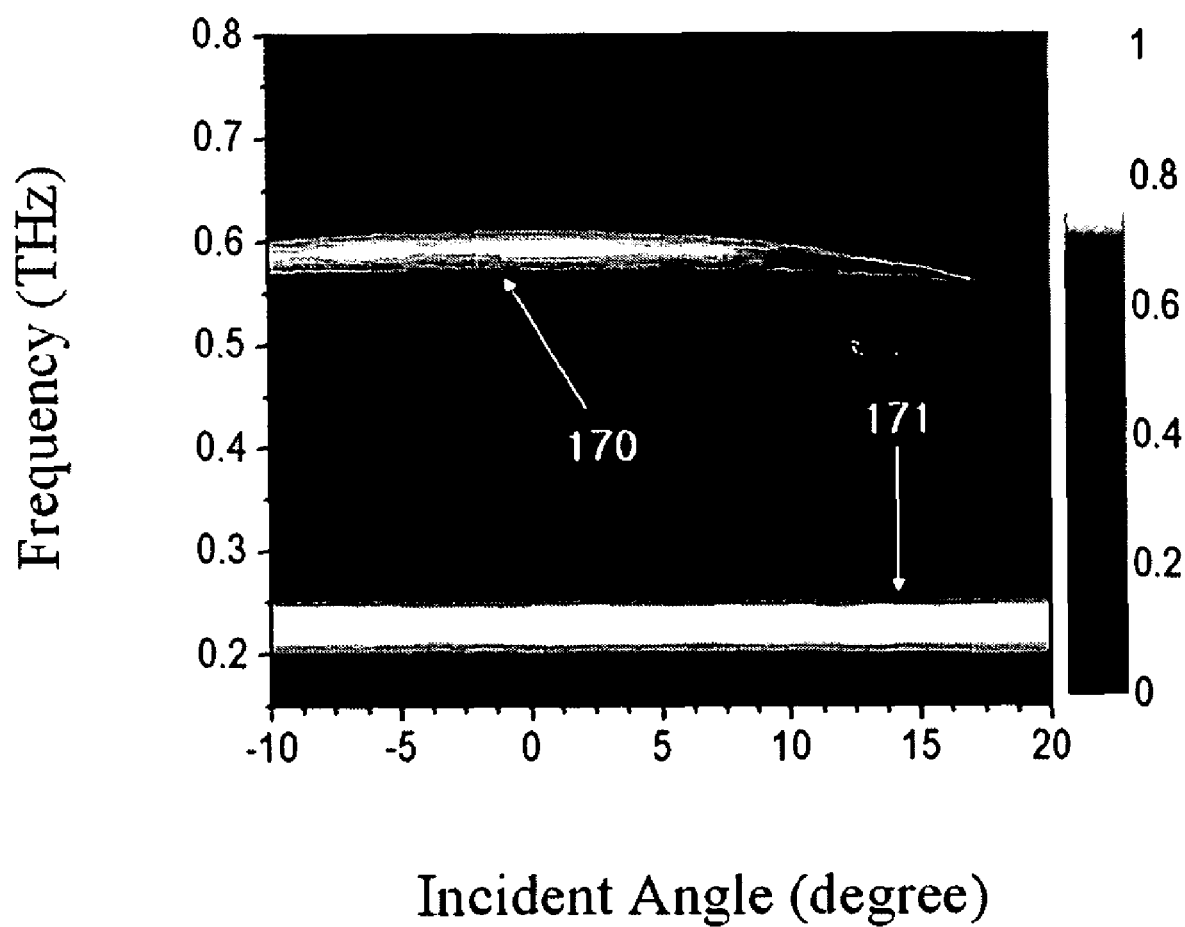
FIG. 17 shows dependency on the incident angle of incident light with respect to the array structure of ∈ shapes.

In FIG. 12, the incident angle dependency of incident light in an asymmetrical structure can be confirmed through filter rotation from the direction 122 toward another direction perpendicular to 123 and 122 with respect to the direction 123. FIG. 16 shows an incident angle dependency of incident angle in the array structure of horseshoe shapes. Here, two transmission resonance wavelengths 160 and 161 exhibit different variations where 161 is not dependent upon the incident angle, but in case of 160 the transmission characteristic varies with the incident angle noticeably. This is because of relative relationship in the positions between the shape resonance causing this transmission characteristic and Rayleigh line caused by periodicity. 160 adjacent to Rayleigh line is strongly affected by incident angle, but 161 far away from Rayleigh line is rarely affected.

This characteristic can be confirmed in the array structure of ∈ shapes. In this case, however, dissimilar to the horseshoe shape, two transmission resonance wavelengths both are far away from Rayleigh line and thus both are less affected by incident angle of incident light, to thereby exhibit a transmission resonance wavelength position, which is rarely changed with incident angle. This means achievement of an omni-direction filter having two outstanding transmission resonance wavelengths. In the ∈ shape of FIG. 12, the length d, the whole length f of the internal structure, and the width e can be designed appropriately to achieve desired characteristics.

Figure 18:
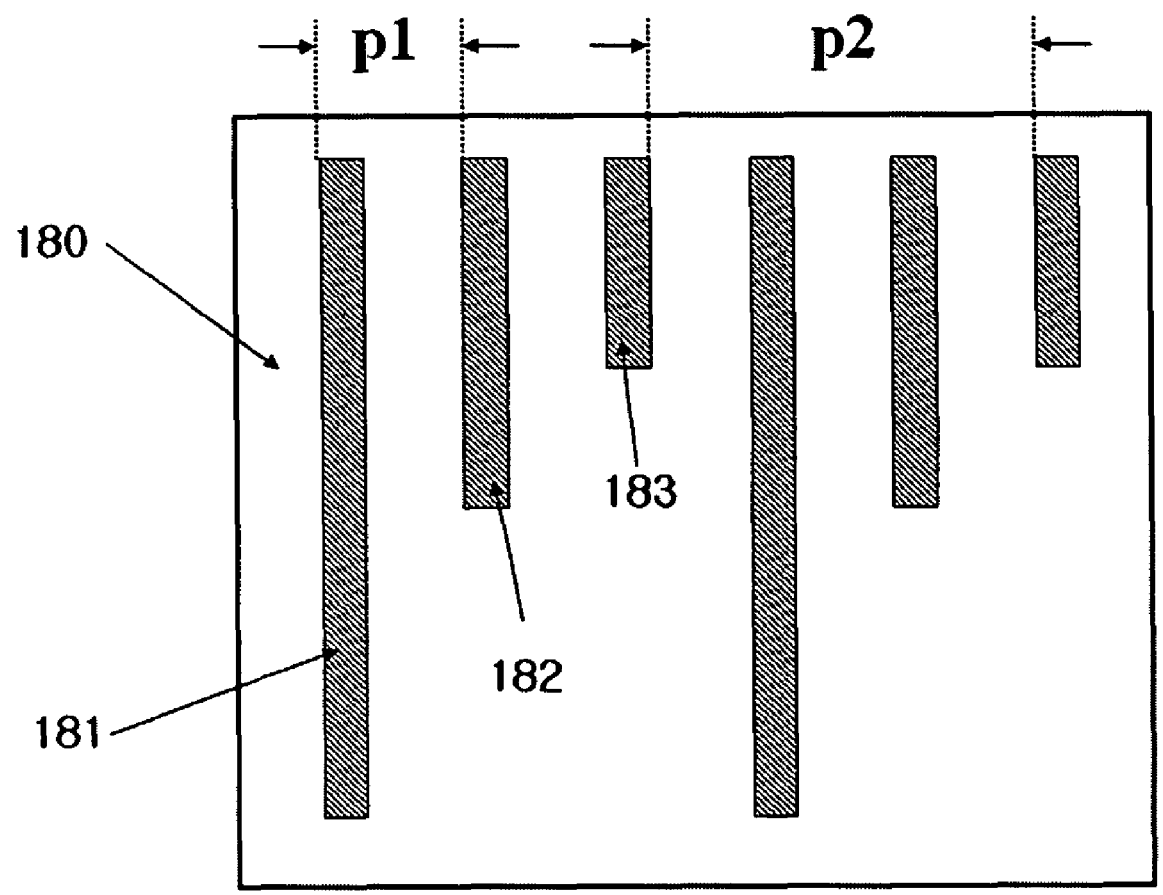
FIG. 18 shows a parallel combination of three rectangular shapes that is one of special shaped arrays for a filter having three or more transmission resonance wavelengths beyond the dual-wavelength filter.

In order to fabricate a filter having three or more transmission resonance wavelengths beyond the above dual-wavelength filter, a special shaped array structure is designed according to the invention. FIG. 18 shows one of these special cases. Three or more transmission resonance wavelengths can be implemented through parallel combination of symmetrical or asymmetrical shapes. FIG. 18 shows a parallel combination of three rectangular shapes 181, 182 and 183 provided on a metallic layer 180. Of course, the basic shapes constituting the parallel combination may vary, and the characteristics of transmission resonance wavelength are determined by combined properties of shape resonance of the basic pattern itself and Rayleigh line due to periodic array of the parallel combination of the basic shapes.

Figure 19:
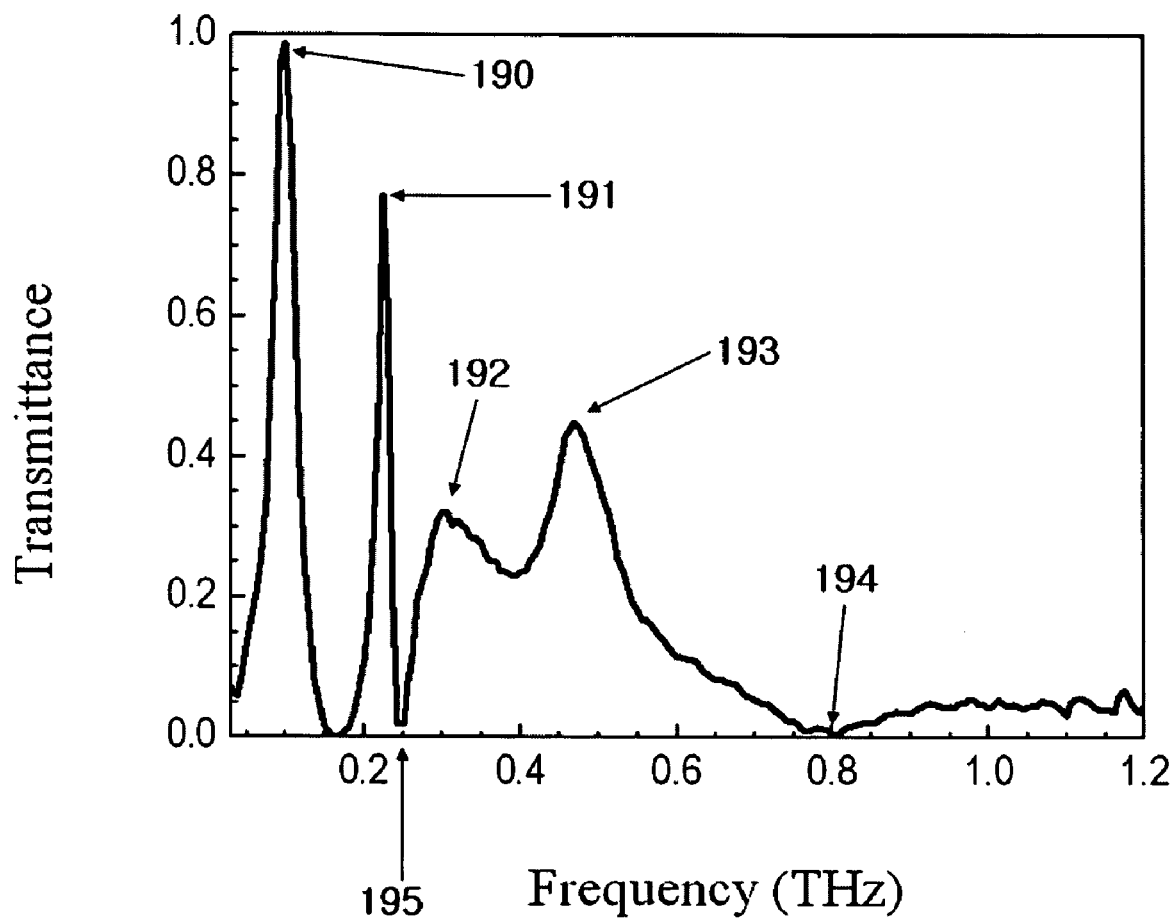
FIG. 19 is a graph showing transmission characteristics by a filter fabricated through the design of FIG. 18.

FIG. 19 is a graph showing transmission characteristics by a filter fabricated through the design of FIG. 18. In this case, it has been found that basically a transmission resonance by shape resonance of the three basic shapes in FIG. 18 occurs at three wavelengths 190, 191 and 193. In this experiment, the period p1 of each shape was 400 microns and thus Rayleigh minima is exhibited at near 0.75 THz 194. In case of the filter used in this experiment, the experiment result shows another periodicity, which is a period p2 in the combination of the three basic shapes. This periodicity can be confirmed at 195 in FIG. 19. Due to the Rayleigh minima occurred at 195, a shape resonance occurring at the middle of wavelength band is divided into two wavelengths 191 and 192. Therefore, consequently, four transmission resonance wavelengths are obtained.

The above transmission resonance characteristics due to a shape resonance can be further expandable and thus allow for a filter having three or more transmission resonance wavelengths. During this course of actions, Rayleigh minima play important roles.

Figure 20:
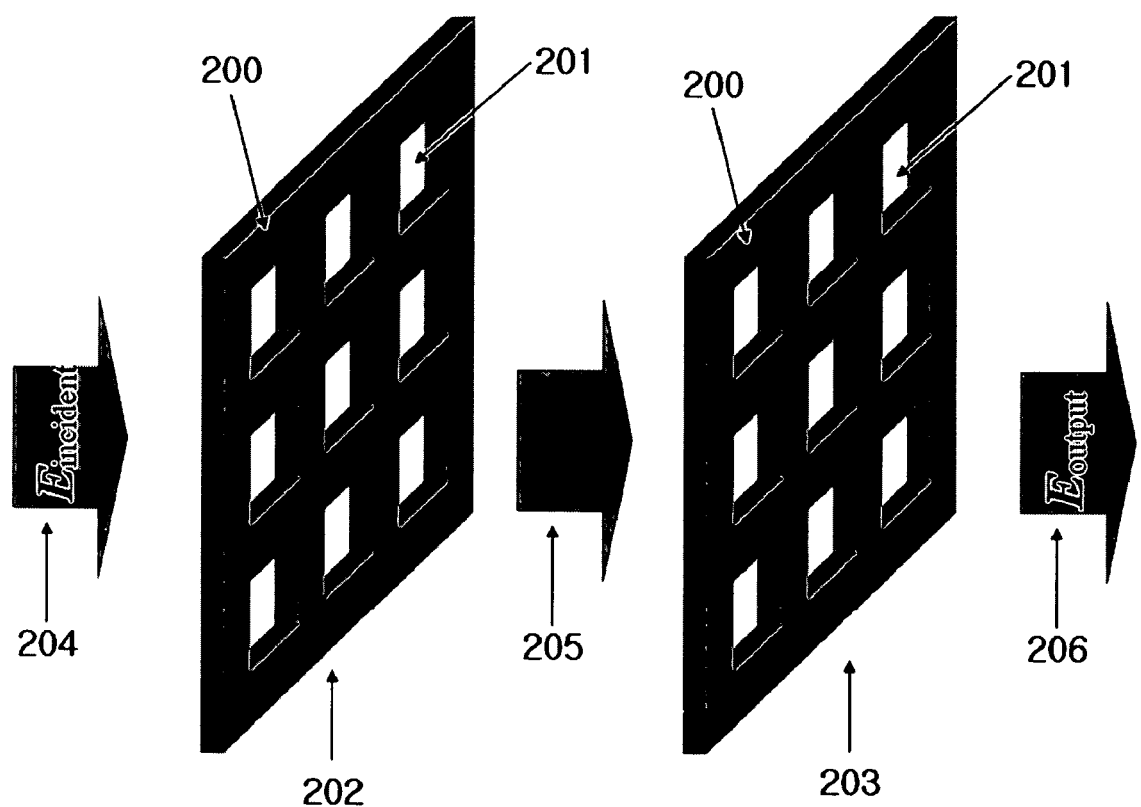
FIG. 20 is a perspective view of a filter for achieving transmission characteristics having a narrow wavelength width or quasi-monochromatic wavelength.
Figure 21:
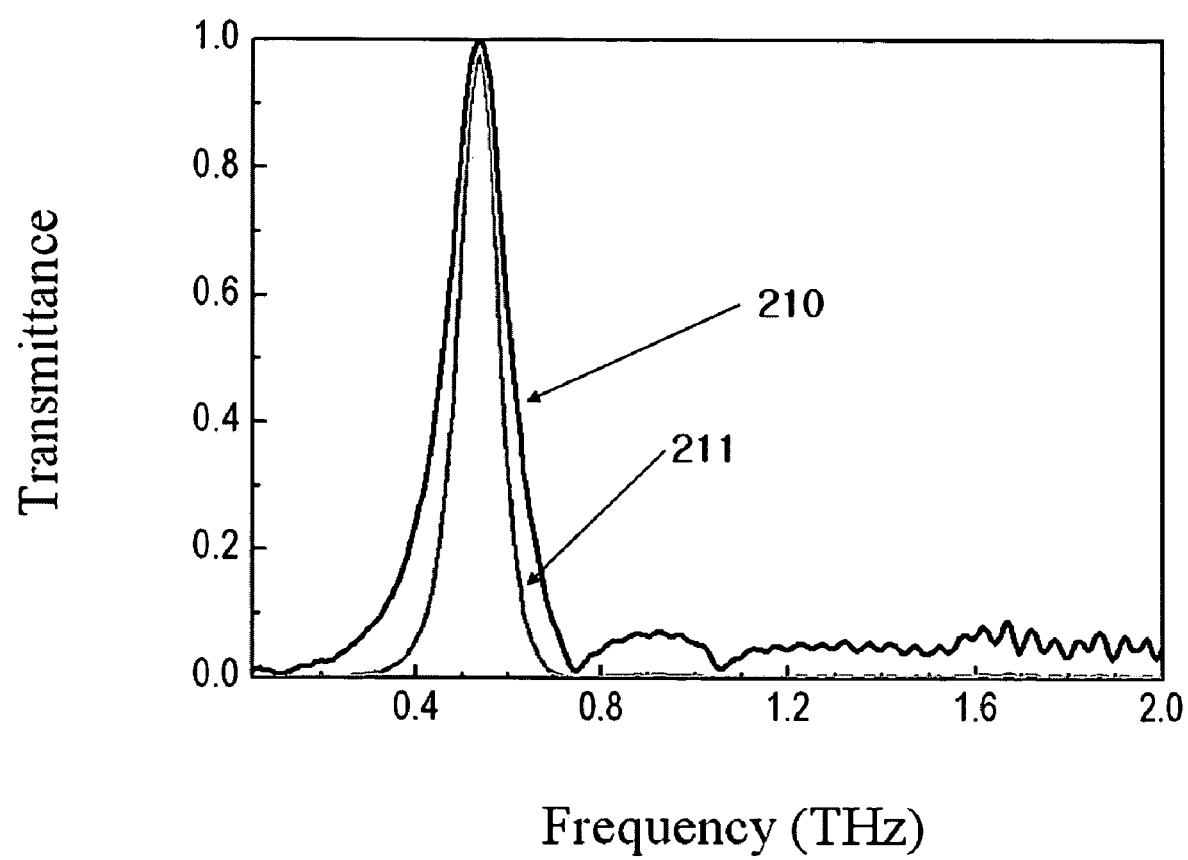
FIG. 21 is a graph showing a transmittance after passing through a single filter and a transmittance after passing through the same filter one more time.

FIG. 20 is a perspective view of a filter for achieving transmission characteristics having a narrow wavelength width or quasi-monochromatic wavelength. When an array structure 202, 203 of shapes having an almost perfect transmittance at a transmission resonance wavelength is disposed in plural along the direction of an incident light 204, the wavelength width of the transmission resonance wavelength comes to decrease gradually as passing through each of the array structures. In FIG. 21, 210 shows a transmittance after passing through one filter as indicated at 20 in FIG. 20, and 211 shows a transmittance after further passing through another filter of the same shape as indicated at 206 in FIG. 20. It can be seen from FIG. 21 that the wavelength width is significantly decreased while the transmission resonance wavelength is rarely changed. These characteristics can be achieved in any cases of shapes providing an almost perfect transmittance.

The present invention provides for a filter using a selective transmission characteristic at infrared or terahertz region through a periodic or random array of through-holes formed on a metallic layer. According to the inventors' experiments, transmission characteristics are related to a basic through-hole shape and thus a filter having a desired characteristic can be achieved through an appropriate design of the through-hole shape. Filter applications have been confirmed through the experiments of the invention. First, the invention provides for a single, dual filter or a higher level filter by controlling the number of transmission resonance wavelengths. Second, the invention provides for a wavelength-variable filter and an omni-directional filter. Third, the invention provides for a quasi-monochromatic filter. Fourth, the invention provides for a wavelength switching filter. The above various functions may be combined through an appropriate design of through-hole shape to thereby enable to fabricate a filter having a variety of applications, which can perform a high efficiency transmission of 90% or more. A filter designed and fabricated through a shape resonance of the invention has wide optical applications over terahertz and infrared region.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A single resonance filter having a single transmission resonance wavelength using shape resonance with a high transmittance, the resonance filter comprising:

a substrate having a first surface and a second surface; and a periodic or random array of through-holes formed so as to pass through the first surface and the second surface, the through-hole having a size of subwavelength and a symmetrical shape with respect to a polarization direction of incident light toward the first surface, wherein a single transmission resonance wavelength is determined by the shape of the through-hole, and wherein the symmetrical shape includes a square shape, a rectangular shape, a circular shape, a slit shape, or a combination thereof, the resonance filter further comprising two metallic layers placed on the first surface of the substrate, one metallic layer being fixed and the other metallic layer being adjusted along a direction perpendicular to the polarization direction such that incident light can continuously recognize the variations in length of the rectangular shape in the direction perpendicular to the polarization directions, thereby the single transmission resonance wavelength is continuously varying.

2. The single resonance filter as claimed in claim 1, wherein the single resonance filter exhibits non-variable omni-directional function regardless of an angle of the incident light with respect to the first surface since the length thereof perpendicular to the polarization direction of the incident light is adjusted to be made so long that transmission resonance wavelength becomes far away from Rayleigh line due to periodicity.

3. The single resonance filter as claimed in claim 1, wherein the substrate is formed of a material having free electrons.

4. The single resonance filter as claimed in claim 3, wherein the material having free electrons includes a metal or a semiconductor.

5. The single resonance filter as claimed in claim 1, wherein the symmetrical shape has a wavelength transformation function by varying the ratio of two lengths along two polarization directions of the incident light perpendicular to each other.

6. The single resonance filter as claimed in claim 1, wherein the array of the through-holes having the symmetrical shape is configured such that same shapes are disposed at regular intervals along advancing direction of the incident light to thereby transmit more than 90% of quasi-monochromatic wavelength having a narrow line width among the incident light.

7. The single resonance filter as claimed in claim 1, wherein the single resonance filter exhibits a high transmittance capable of transmitting more than 90% of the incident light.

* * * * *